United States Patent
Zhu

(10) Patent No.: US 11,991,423 B2
(45) Date of Patent: May 21, 2024

(54) VIRTUAL VIDEO LIVE STREAMING PROCESSING METHOD AND APPARATUS, STORAGE MEDIUM AND ELECTRONIC DEVICE

(71) Applicant: Tencent Technology (Shenzhen) Company Limited, Shenzhen (CN)

(72) Inventor: Shaoming Zhu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 82 days.

(21) Appl. No.: 17/961,133

(22) Filed: Oct. 6, 2022

(65) Prior Publication Data
US 2023/0033378 A1    Feb. 2, 2023

Related U.S. Application Data

(63) Continuation of application No. PCT/CN2021/123818, filed on Oct. 14, 2021.

(30) Foreign Application Priority Data

Nov. 26, 2020 (CN) .......................... 202011356995.7

(51) Int. Cl.
*H04N 21/2187* (2011.01)
*G10L 13/08* (2013.01)
(Continued)

(52) U.S. Cl.
CPC .......... *H04N 21/816* (2013.01); *G10L 13/08* (2013.01); *H04N 21/2187* (2013.01); *H04N 21/8547* (2013.01)

(58) Field of Classification Search
CPC ............. H04N 21/816; H04N 21/2187; H04N 21/8547; G10L 13/08
See application file for complete search history.

(56) References Cited

U.S. PATENT DOCUMENTS

2010/0142913 A1    6/2010  Hasegawa
2013/0294749 A1*  11/2013  Burns ................ H04N 21/6543
                                                                 386/278
(Continued)

FOREIGN PATENT DOCUMENTS

CN    107277599 A    10/2017
CN    111010589 A     4/2020
(Continued)

OTHER PUBLICATIONS

International Search Report and Written Opinion with English Translation for International Patent Application No. PCT/CN2021/123818 dated Jan. 14, 2022, 13 pages.

*Primary Examiner* — Thai Q Tran
*Assistant Examiner* — Jose M Mesa
(74) *Attorney, Agent, or Firm* — Crowell & Moring LLP

(57) ABSTRACT

The application provides a virtual video live streaming processing method and apparatus, an electronic device, and a computer-readable storage medium, and relates to the field of virtual video live streaming technologies. The virtual video live streaming processing method includes: obtaining text data and determining to-be-synthesized video data corresponding to the text data; synthesizing a live video stream in real time according to the to-be-synthesized video data and pushing the live video stream to a live streaming client; determining target video data from the to-be-synthesized video data that has not been synthesized into a live video stream in response to a live streaming interruption request during receiving a live streaming interruption request; and synthesizing an interruption transition video stream according to the target video data and pushing the interruption transition video stream to the live streaming client. When a live video is interrupted during a virtual video live streaming process, this application may implement a smooth transition (Continued)

process between a current video action and a next video action without affecting real-time performance of the live video.

20 Claims, 5 Drawing Sheets

(51) Int. Cl.
*H04N 21/81* (2011.01)
*H04N 21/8547* (2011.01)

(56) References Cited

U.S. PATENT DOCUMENTS

2021/0392393 A1* 12/2021 Olsson ............... H04N 21/4331
2022/0070504 A1* 3/2022 Hartnett ........... H04N 21/21805

FOREIGN PATENT DOCUMENTS

| CN | 111182358 A | 5/2020 |
| CN | 111866529 A | 10/2020 |
| CN | 112543342 A | 3/2021 |

* cited by examiner

VIRTUAL VIDEO LIVE STREAMING PROCESSING METHOD AND APPARATUS, STORAGE MEDIUM AND ELECTRONIC DEVICE

RELATED APPLICATION

This application is a continuation application of PCT Patent Application No. PCT/CN2021/123818, filed on Oct. 14, 2021, which claims priority to Chinese Patent Application No. 202011356995.7, filed with the China National Intellectual Property Administration, PRC on Nov. 26, 2020, each of which is incorporated by reference in its entirety.

FIELD OF THE TECHNOLOGY

This application relates to the field of virtual live streaming technologies, and specifically, to virtual live streaming processing technologies.

BACKGROUND OF THE DISCLOSURE

As communications technologies develop, network communication bandwidth improves greatly. Video live streaming technologies become increasingly mature, and have been applied in various aspects. In addition, as artificial intelligence technologies develop, text-to-speech (TTS) technologies and image synthesis technologies have also become research hotspots. A combination of video live streaming technologies and artificial intelligence technologies (for example, virtual video live streaming technologies) can play a role in many fields, such as replacing a real person to do virtual news broadcast and replacing a game anchor to give a virtual game commentary, which has broad prospects of application in the future.

In the virtual video live streaming technologies, generation of an audio and a picture requires a large quantity of computing time. In order to ensure real-time performance of virtual video live streaming, realization of virtual video real-time streaming has become an important factor that affects final quality of a live video. Most of existing real-time video live streaming methods are aimed at application scenarios where there is existing stable audio and picture data input (for example, local video streaming), or where audio and picture data can be quickly obtained (for example, a camera obtains data).

Information partially disclosed in the background is only used for enhancing the understanding of the background of this application, and therefore, may include information that does not constitute a limitation on the related art known to a person of ordinary skill in the art.

SUMMARY

An objective of this application is to provide a virtual video live streaming processing method, a virtual video live streaming processing apparatus, an electronic device, and a computer-readable storage medium, which can generate a live video stream in real time even if there is no stable data source and can, to a certain extent, overcome problems such as video freezing caused by a hard switching method used in the existing virtual video live streaming technologies for video interruption processing, thus improving smoothness of virtual video live streaming.

According to a first aspect of this application, a virtual video live streaming processing method is provided, performed by an electronic device, the method including: obtaining text data and determining to-be-synthesized video data corresponding to the text data; synthesizing a live video stream in real time according to the to-be-synthesized video data and pushing the live video stream to a live streaming client; determining target video data in the to-be-synthesized video data that has not been synthesized into a live video stream in response to a live streaming interruption request during receiving the live streaming interruption request; and synthesizing an interruption transition video stream according to the target video data, and pushing the interruption transition video stream to the live streaming client.

According to a second aspect of this disclosure, a virtual video live streaming processing apparatus is provided, disposed in an electronic device, the apparatus including: a data determining module, configured to obtain text data and determine to-be-synthesized video data corresponding to the text data; a first video synthesis module, configured to synthesize a live video stream in real time according to the to-be-synthesized video data and push the live video stream to a live streaming client; an interruption response module, configured to determine target video data from the to-be-synthesized video data that has not been synthesized into a live video stream in response to a live streaming interruption request during receiving the live streaming interruption request; and a second video synthesis module, configured to synthesize an interruption transition video stream according to the target video data and push the interruption transition video stream to the live streaming client.

In an exemplary embodiment of this disclosure this disclosure, the data determining module includes: a target text determining unit, configured to determine associated text data related to the text data and use the text data and the associated text data as target text; an audio feature generation unit, configured to convert the target text into a corresponding target word vector, and encode and decode the target word vector to generate an audio feature of the target word vector; an audio data generation unit, configured to synthesize the audio feature to generate the audio data; and an image generation unit, configured to determine expression feature data corresponding to the target text, and generate the video output images according to the expression feature data.

In an exemplary embodiment of this disclosure, an image generation unit includes: a face image generation unit, configured to perform rendering processing on the expression feature data to generate a face image corresponding to a virtual object; a background image determining unit, configured to determine background images that match the face image; the background images including body movement information and environment background information of the virtual object; and an image fusion unit, configured to perform image fusion processing on the face image and the background images to generate the video output images.

In an exemplary embodiment of this disclosure, the background image determining unit includes: an audio duration determining subunit, configured to determine audio duration of the audio data that is time-aligned with the face image; a video duration determining subunit, configured to determine video duration of an output video according to the audio duration; and a background image determining subunit, configured to determine the background images that match the face image from a pre-stored background image set according to the video duration.

In an exemplary embodiment of this disclosure, the background image determining subunit is configured to determine a quantity of an object action of the virtual object in the output video under the video duration; and determine the background images of a same quantity group from the background image set as the background images that match the face image according to the quantity of the object action.

In an exemplary embodiment of this disclosure, an interruption response module includes: a target image determining unit, configured to determine remaining video output data from the to-be-synthesized video data that has not been synthesized into a live video stream in response to the live streaming interruption request and determine target video images according to the remaining video output data; a target audio determining unit, configured to determine remaining audio data from the to-be-synthesized video data that has not been synthesized into a live video stream in response to the live streaming interruption request and determine target audio data according to the remaining audio data and the target video images; and a video data determining unit, configured to use the target video images and the target audio data as the target video data.

In an exemplary embodiment of this disclosure, a target image determining unit includes: a duration determining subunit, configured to determine remaining image frame duration corresponding to remaining video output images; a target image determining subunit, configured to determine, in a case that the remaining image frame duration is greater than a duration threshold, a frame skipping step; and determine the target video images from the remaining video output images according to the frame skipping step.

In an exemplary embodiment of this disclosure, a target image determining subunit includes: a frame skipping step determining subunit, configured to obtain an image frame rate corresponding to the remaining video output images and determine a quantity of remaining images of the remaining video output images; and determine the frame skipping step according to the quantity of remaining images and the image frame rate; and an image determining subunit, configured to determine the target video images from the remaining video output images in chronological order and according to the frame skipping step.

In an exemplary embodiment of this disclosure, an image determining subunit is configured to obtain a first frame image and a last frame image of the remaining video output images; determine an intermediate image from the remaining video output images at every frame skipping step in the chronological order, starting from the first frame image; and use the first frame image, the intermediate image, and the last frame image as the target video images.

In an exemplary embodiment of this disclosure, a target image determining unit may further be configured to determine a quantity of target images of the target video images according to the frame skipping step; determine an image similarity between two adjacent images in the remaining video output images; and determine the target video images, a quantity of which does not exceed the quantity of target images from the remaining video output images according to the image similarity.

In an exemplary embodiment of this disclosure, a target audio determining unit is configured to determine remaining audio duration of the remaining audio data; delete, in a case that the remaining audio duration is greater than a duration threshold, the remaining audio data; determine target image frame duration corresponding to the target video images; and generate the target audio data according to the target image frame duration.

In an exemplary embodiment of this disclosure, an interruption response module further includes an animation generation subunit, the animation subunit being configured to use the first video output image of the to-be-synthesized video data that has not been synthesized into a live video stream as a first interruption image in response to the live streaming interruption request; use the last video output image of the to-be-synthesized video data that has not been synthesized into a live video stream as a second interruption image in response to the live streaming interruption request; and generate the interruption transition animation of a preset duration according to the first interruption image and the second interruption image.

According to a third aspect of this disclosure, an electronic device used for virtual video live streaming processing, including a processor; and a memory, the memory storing computer-readable instructions, when the computer-readable instructions being executed by the processor, any one of the foregoing methods being performed.

According to a fourth aspect of this disclosure, a non-transitory computer-readable storage medium is provided, the non-transitory computer-readable storage medium storing a computer program, when the computer program being executed by a processor, any one of the foregoing methods being performed.

According to a fifth aspect of disclosure, a computer program product is provided, the computer program product, when executed, being configured to perform any one of the foregoing methods.

Exemplary embodiments of this disclosure have the following beneficial effects:

In the virtual video live streaming processing provided by an exemplary implementation of this application, in a process of synthesizing the live video stream in real time according to the to-be-synthesized video data corresponding to the text data and pushing the live video stream to the live streaming client, if the live streaming interruption request is received, determine the target video data from the to-be-synthesized video data that has not been synthesized into a live video stream, so as to synthesize the interruption transition video stream according to the target video data. On the one hand, the corresponding to-be-synthesized video data is generated through the text data. During a video live streaming process, the live video stream may be generated in real time even if there is no stable data source. On the other hand, problems such as video freezing caused by hard switching used for video interruption processing are avoided, thus effectively performing smooth transition processing when a live video is interruption, and improving smoothness of the virtual video live streaming.

It is to be understood that the foregoing general descriptions and the following detailed descriptions are merely for exemplary and explanatory purposes, and cannot limit this application.

BRIEF DESCRIPTION OF THE DRAWINGS

The accompanying drawings herein, which are incorporated into the specification and constitute a part of this specification, show embodiments that conform to this application, and are used for describing a principle of this application together with this specification. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
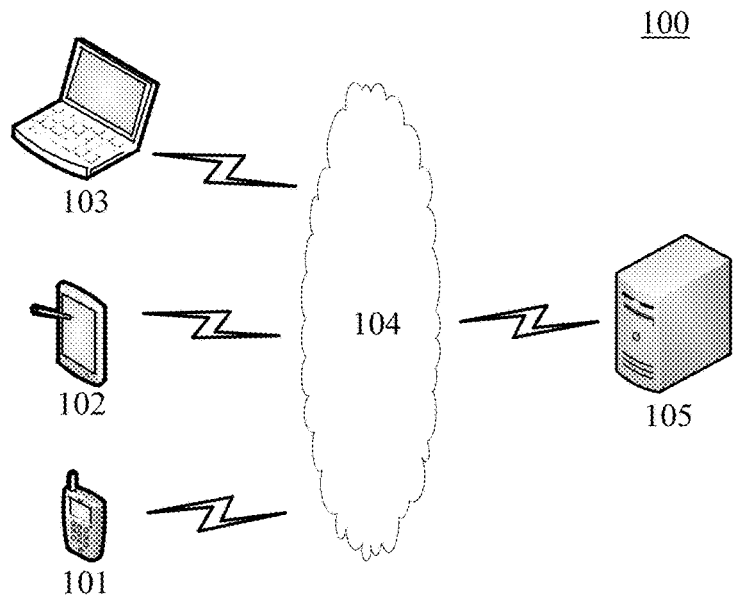
FIG. 1 is a schematic diagram of an exemplary system architecture to which an image fusion method and apparatus according to embodiments of this disclosure are applicable.

Now, exemplary implementations are described more comprehensively with reference to the accompanying drawings. However, the exemplary implementations may be implemented in various forms, and are not to be understood as being limited to the examples described herein. Instead, the implementations are provided to make this application more thorough and complete and fully convey the idea of the exemplary implementations to a person skilled in the art. The described features, structures, or characteristics may be combined in one or more implementations in any appropriate manner. In the following description, many specific details are provided to give a full understanding of the implementations of this application. However, it is to be appreciated by a person skilled in the art that one or more of the specific details may be omitted during practice of the technical solutions of this application, or other methods, components, apparatus, steps, or the like may be used. In other cases, well-known technical solutions are not shown or described in detail to avoid overwhelming the subject and thus obscuring various aspects of this application.

In addition, the accompanying drawings are merely exemplary illustrations of the present disclosure and are not necessarily drawn to scale. The same reference numbers in the accompanying drawings represent the same or similar parts, and therefore, repeated descriptions thereof are omitted. Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes fields such as a CV technology, a speech processing technology, a natural language processing technology, and machine learning/deep learning (DL).

The solutions provided in embodiments of this disclosure relate to technologies such as virtual video live streaming processing, which are specifically described by using the following embodiments.

FIG. 1 is a schematic diagram showing a system architecture of an exemplary application environment of a virtual video live streaming processing method and an apparatus applicable to the embodiments of this disclosure.

As shown in FIG. 1, a system architecture 100 may include one or more of terminal devices 101, 102, and 103, a network 104, and a server 105. The network 104 is a medium configured to provide a communication link between the terminal devices 101, 102 and 103 and the server 105. The network 104 may include various connection types such as wired and wireless communication links or fiber optic cables. The terminal devices 101, 102, and 103 may be various electronic devices with display screens, including but not limited to, a desktop computer, a portable computer, a smart phone, a tablet, and the like. It is to be understood that quantities of terminal devices, networks, and servers in FIG. 1 are merely exemplary. There may be any quantities of terminal devices, networks, and servers according to an implementation requirement. For example, the server 105 may be a server cluster that includes a plurality of servers.

The virtual video live streaming processing method provided in the embodiment of this disclosure is generally performed by the server 105, and accordingly, the virtual video live streaming processing apparatus is generally disposed in the server 105. However, it is to be readily understood by a person skilled in the art that the virtual video live streaming processing method may alternatively be performed by the terminal devices 101, 102 and 103 to provide a virtual video live streaming processing service for other terminal devices, and accordingly, the virtual video live streaming processing apparatus may be disposed in the electronic devices 101, 102, and 103, which is not particularly limited in this exemplary embodiment. For example, in an exemplary embodiment, a user may upload text data to the server 105 through the terminal devices 101, 102, and 103, and the server generates a live video stream and an interruption transition video stream according to to-be-synthesized video data corresponding to the text data and the virtual video live streaming processing method provided in the embodiment of this disclosure, and sends the live video stream and the interruption transition video stream to the terminal devices 101, 102, and 103.

Figure 2:
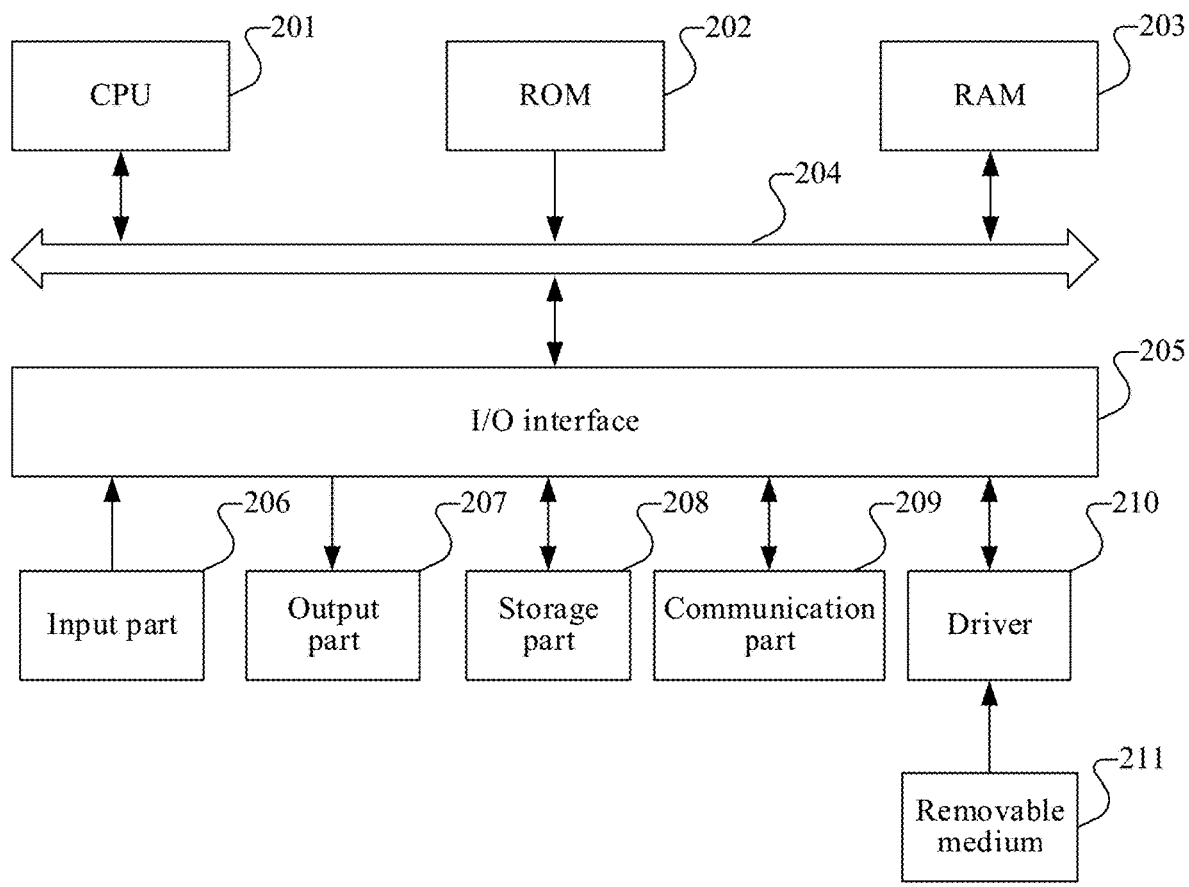
FIG. 2 is a schematic structural diagram of an exemplary computer system adapted to implement an electronic device according to an embodiment of this disclosure.

FIG. 2 is a schematic structural diagram of a computer system adapted to implement an electronic device according to an embodiment of this disclosure.

A computer system 200 of the electronic device shown in FIG. 2 is merely an example, and does not constitute any limitation on functions and use ranges of the embodiment of this disclosure.

As shown in FIG. 2, the computer system 200 includes a central processing unit (CPU) 201, which may perform various proper actions and processing based on a program stored in a read-only memory (ROM) 202 or a program loaded from a storage part 208 into a random access memory (RAM) 203. The RAM 203 further stores various programs and data required for a system operation. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk or the like; and a communication part 209 of a network interface card, including a LAN card, a modem, or the like. The communication part 209 performs communication processing by using a network such as the Internet. A driver 210 is also connected to the I/O interface 205 as required. A removable medium 211, such as a magnetic disk, an optical disc, a magneto-optical disk, or a semiconductor memory, is mounted on the driver 210 as required, so that a computer program read from the removable medium is installed into the storage part 208 as required.

Particularly, according to the embodiment of this disclosure, the processes described in the following by referring to the flowcharts may be implemented as computer software programs. For example, the embodiment of this disclosure includes a computer program product, including a computer program carried on a computer-readable medium, the computer program including program code used for performing the methods shown in the flowcharts. In such an embodiment, the computer program may be downloaded and installed from a network through the communication part 209, and/or installed from the removable medium 211. When the computer program is executed by the CPU 201, various functions defined in the method and apparatus of this application are executed. In some embodiments, the computer system 200 may further include an AI processor. The AI processor is configured to process computing operations related to machine learning.

The computer-readable medium according to this application may be a computer-readable signal medium or a non-transitory computer-readable storage medium or any combination thereof. The computer-readable storage medium may be, for example, but is not limited to, an electric, magnetic, optical, electromagnetic, infrared, or semi-conductive system, apparatus, or device, or any combination thereof. More specifically, the non-transitory computer-readable storage medium may include, for example, but is not limited to, an electrical connection having one or more wires, a portable computer disk, a hard disk, an RAM, an ROM, an erasable programmable read-only memory (EPROM or flash memory), an optical fiber, a portable compact disc read-only memory (CD-ROM), an optical storage device, a magnetic storage device, or any suitable combination of the foregoing. In this application, the non-transitory computer-readable storage medium may be any tangible medium including or storing a program, and the program may be used by or in combination with an instruction execution system, apparatus, or device. In this application, the computer-readable signal medium may include a data signal being in a baseband or propagated as at least a part of a carrier wave, and carry computer-readable program code. The propagated data signal may be in a plurality of forms, including, but not limited to, an electromagnetic signal, an optical signal, or any appropriate combination thereof. The computer-readable signal medium may be further any computer-readable medium in addition to a non-transitory computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to, a wireless medium, a wire, an optical cable, radio frequency (RF) or the like, or any other suitable combination thereof.

The flowcharts and block diagrams in the accompanying drawings illustrate possibly implemented system architectures, functions, and operations of a system, a method, and a computer program product according to various embodiments of this disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this disclosure may be implemented in a software manner, or may be implemented in a hardware manner, and the unit described may a target image determining unit may be set in a processor. Names of these units do not constitute a limitation on the units in a case.

According to another aspect, this application further provides a computer-readable medium. The computer-readable medium may be included in the electronic device described in the foregoing embodiments, or may exist alone and is not assembled in the electronic device. The computer-readable medium carries one or more programs, the one or more programs, when executed by the electronic device, causing the electronic device to implement the method described in the following embodiment. For example, the electronic device may implement the steps shown in FIG. 3 to FIG. 9.

The technical solutions of the embodiment of this disclosure are described in detail in the following.

In virtual video live streaming technologies, a live video stream is mainly generated according to an audio and image, and the live video stream is pushed to a live streaming client in real time, where the live streaming client may be installed on terminal devices 101, 102, and 103 shown in FIG. 1. A process of generating the audio and image requires a large quantity of computing time. In order to ensure real-time performance of virtual video live streaming, realization of virtual video real-time streaming has become an important factor that affects final quality of a live video. Most of existing real-time video live streaming methods are aimed at application scenarios where there is existing stable audio and picture data input (for example, local video streaming), or where audio and picture data can be quickly obtained (for example, a camera obtains data).

However, these stable data sources cannot be well applied in the virtual video live streaming; and in addition, existing virtual video live streaming technologies do not support smooth transition processing during a video interruption without affecting the real-time performance of live streaming. In a process of virtual video live streaming, if a live streaming interruption request is received, the live streaming interruption request is generally processed by hard switching; or the interruption processing is not performed until a current video playback is completed.

In the process of virtual video live streaming, performing hard switching on the interruption request leads to live video freezing, and smooth transition between a current video action and a next video action cannot be achieved; In addition, if the interruption processing is not performed during video live streaming, a user cannot sense a real-time response of the live video.

Figure 3:
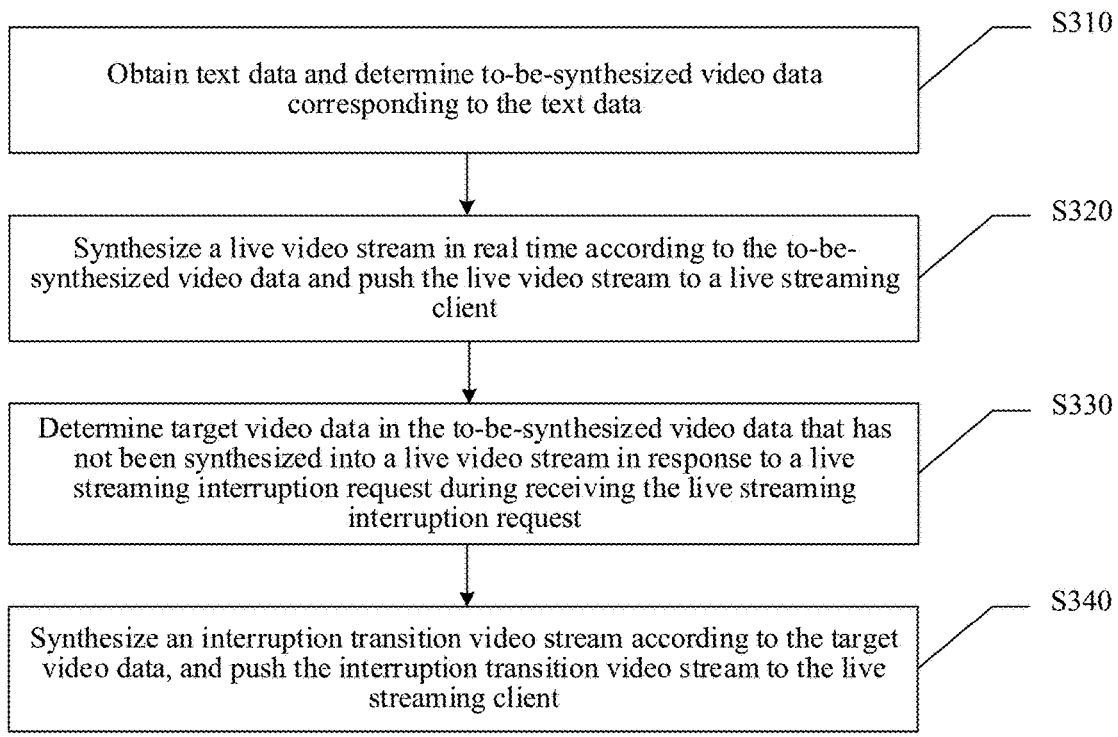
FIG. 3 schematically shows a flowchart of an exemplary virtual video live streaming processing method according to an embodiment of this disclosure.

Based on the foregoing one or more problems, this exemplary implementation provides a virtual video live streaming processing method. The virtual video live streaming method may be applied to the server 105, or may be applied to one or more of the terminal devices 101, 102, and 103, which is not particularly limited in this exemplary embodiment. As shown in FIG. 3, the virtual video live streaming processing method may include the following steps S310 to S340.

S310. Obtain text data and determine to-be-synthesized video data corresponding to the text data.

S320. Synthesize a live video stream in real time according to the to-be-synthesized video data and push the live video stream to a live streaming client.

S330. Determine target video data from the to-be-synthesized video data that has not been synthesized into a live video stream in response to a live streaming interruption request, during the live streaming process.

S340. Synthesize an interruption transition video stream according to the target video data, and push the interruption transition video stream to the live streaming client.

In the virtual video live streaming processing method provided by the exemplary implementation, in a process of synthesizing the live video stream in real time according to the to-be-synthesized video data corresponding to the text data and pushing the live video stream to the live streaming client, in a case that the live streaming interruption request is received, the target video data is determined from the to-be-synthesized video data that has not been synthesized into a live video stream, so as to synthesize the interruption transition video stream according to the target video data. On the one hand, the corresponding to-be-synthesized video data is generated through the text data. During a video live streaming process, the live video stream may be generated in real time even if there is no stable data source. On the other hand, problems such as video freezing caused by hard switching used for video interruption processing are avoided, thus effectively performing smooth transition processing when a live video is interrupted, and improving smoothness of a virtual video live streaming.

The foregoing steps of the exemplary embodiment are described more specifically below.

In step S310, the text data is obtained and the to-be-synthesized video data corresponding to the text data is determined.

In this exemplary implementation, the text data may be the text data on which the to-be-synthesized video data is generated, and the text data may be words that a virtual object speaks in the live video. For example, a user may input the text data through the live streaming client, and the user may alternatively select corresponding text data from many optional texts provided by the live streaming client; and the text data may alternatively be pre-stored in a server. The to-be-synthesized video data may be associated video data on which generating a live video stream depends during a virtual video live streaming process. For example, the to-be-synthesized video data may include: image data, audio data, and animation data, where the image data may be an image including a face feature and a body movement of the virtual object, and an environment background corresponding to the virtual object. The audio data may be a simulated human voice, configured to match video output images of the virtual object. The animation data may be an animation generated according to some specific events.

Figure 4:
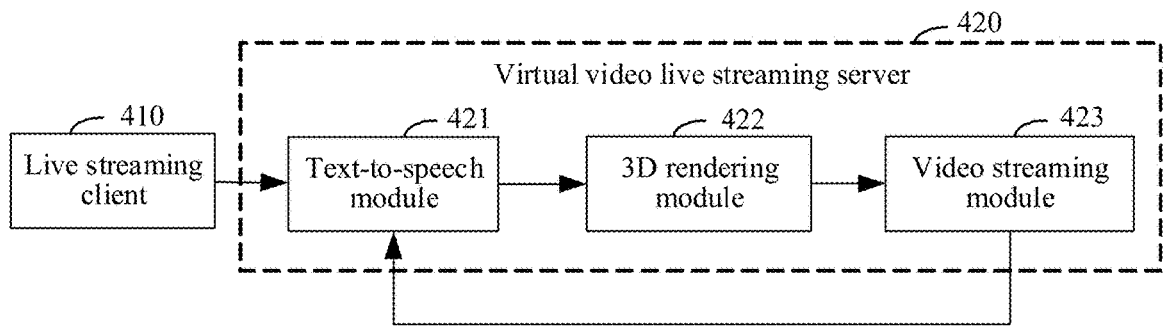
FIG. 4 schematically shows an exemplary overall framework diagram of virtual video live streaming service according to an embodiment of this disclosure.

When performing the virtual video live streaming, a virtual video live streaming server (such as a server) may first obtain the text data, and after obtaining the text data, determine corresponding to-be-synthesized video data according to the text data. FIG. 4 schematically shows an overall framework diagram of virtual video live streaming service according to an embodiment of this disclosure. The virtual live streaming service may include a live streaming client 410 and a virtual video live streaming server 420, where the virtual video live streaming server 420 may include a text-to-speech module 421, a 3D rendering module 422, and a video streaming module 423. When obtaining text data, the virtual video live streaming server 420 may obtain the text data input or selected by a user through the live streaming client 410; and the virtual video live streaming server 420 may alternatively obtain the text data that is pre-stored in a server database. After obtaining the text data, the virtual video live streaming server 420 may generate corresponding to-be-synthesized video data according to the text data.

For example, the to-be-synthesized video data corresponding to the text data may be determined through the following steps.

In an exemplary embodiment of this disclosure, associated text data related to the text data is determined and the text data and the associated text data are used as target text; the target text is converted into a corresponding target word vector, and the target word vector is encoded and decoded to generate an audio feature of the target word vector; the audio feature is synthesized to generate the audio data; and expression feature data corresponding to the target text is determined, and the video output images are generated according to the expression feature data.

The associate text data may be related to the text data. For example, in some human-computer interaction scenarios, when the text data is "how to use product A", the associated text data may be text corresponding to a specific instruction for the use of the product A. The target text may include the text data and the associated text data, for example, the target text may be generated by splicing the text data and the associated text data. The target word vector may be a vector generated by vectorizing the target text. The audio feature may be a key feature corresponding to the audio data converted form the target word vector. For example, the audio feature may include a short-time zero-crossing rate, short-time energy, a spectral centroid and the like. The audio data may be a corresponding audio generated after the text data undergoes a text-to-speech conversion processing. The expression feature data may be a facial expression feature of the virtual object in the live video corresponding to the text data. The video output images may be video images corresponding to the live video.

After obtaining the text data, the associated text data related to the text data may be determined, and the text data and the associated text data are used as the target text. As shown in FIG. 4, the virtual video live streaming server 420 may perform text-to-speech processing on the target text through the text-to-speech module 421, where the text-to-speech module may include a text-to-speech model after training, that is, an initial deep learning text-to-speech model is constructed in advance and the initial text-to-speech model is trained by using a deep learning method, and after completing the training, the text-to-speech model after the training is obtained. After the target text is input into the text-to-speech model obtained after training, the target text may be converted into the corresponding target word vector. For example, the target text may be a sentence, and the target text is segmented to determine a word vector corresponding to each word, that is, the target word vector. After the target word vector is obtained, the target word vector may be encoded to obtain an intermediate semantic identifier, and the target word vector may then be decoded to obtain the audio feature of the target word vector. An audio synthesis algorithm is used for synthesizing the obtained audio feature to generate the audio data corresponding to the target text.

In addition, the text-to-speech module 421 may alternatively generate corresponding expression feature data according to the target text, and generating the corresponding expression feature data may be implemented according to the following technical solutions: predicting a key point of a mouth of the virtual object in the live video according to the audio data of the target text, and performing normalization processing on the key point of the mouth to adapt the key point of the mouth for a standard face template; performing dimension reduction processing on the key point of the mouth after the normalization processing to obtain a mouth shape feature corresponding to the virtual object; performing semantic analysis on the target text to obtain semantics represented by the target text; and determining the expression feature data that matches the semantics according to the semantics represented by the target text, so that the corresponding video output image may be generated subsequently according to the expression feature data.

In an exemplary embodiment of this disclosure, rendering processing is performed on the expression feature data to generate a face image corresponding to the virtual object; background images that match the face image is determined, the background images including body movement information and environment background information of the virtual object; and image fusion processing is performed on the face image and the background images to generate the video output images.

The face image may be a face image corresponding to the virtual object in the live video. The background images may be images that correspond to the face image of the virtual object and includes other features of the virtual object. For example, the background images may include the body movement information of the virtual object and the environment background information corresponding to generating the video output images. The video output images may be images including the face image and a body movement of the virtual object, and a corresponding environment background currently.

Referring to FIG. 4, after the text-to-speech module 421 performs text conversion processing on the text data and generates the to-be-synthesized video data, the generated to-be-synthesized video data may be pushed to the 3D rendering module 422, where the 3D rendering module 422 may perform rendering processing on the expression feature data in the to-be-synthesized video data, that is, combining the mouth shape feature and the expression feature data of the virtual object to generate a face feature of the virtual object and generating the face image corresponding to the virtual object according to the face feature. In the 3D rendering module, since 3D rendering and fusion are very time-consuming, when all the expression feature data is input, all images that are left after the fusion cannot be obtained immediately, but a group of images that are left after the fusion can be obtained by streaming.

When rendering processing is performed on the expression feature data to generate the face image, the processing may be implemented by using an Open Graphics Library (OpenGL) tool. For example, data may be set from a geometric primitive of the OpenGL to be used for constructing a face contour shape of the virtual object; inputted primitive data such as the mouth shape feature and the expression feature data are calculated to determine other rendering attributes such as a position and a color of a key point of a face; a mathematical description of the inputted primitive is converted into a pixel fragment corresponding to a screen position, that is, rasterization processing is performed; for each fragment generated by rasterization, a fragment shader is executed to determine a color and a position of each fragment; and in addition, whether objects corresponding to each fragment are visible may be determined by some additional operations, or a color of the fragment is fused with a color of a current screen.

After the face image is generated, the corresponding background images may be determined according to the face image. After image fusion processing is performed on the face image of the virtual object and the corresponding background images, the video output images corresponding to the virtual object in the live video can be generated. Each video output image can correspond to a body movement of the virtual object at a moment and a corresponding environment background at a current moment. A fusion of the face image and background images to generate a complete video output image may be implemented by a convolutional neural network (CNN).

In an exemplary embodiment of this disclosure, audio duration of the audio data that is time-aligned with the face image is determined; video duration of an output video is determined according to the audio duration; and the background images that match the face image are determined from a pre-stored background image set according to the video duration.

The audio duration may be playback duration of the audio data that is generated according to the target text. The output video may be a live video that is pushed to the live streaming client after the to-be-synthesized video data is synthesized. The video duration may be playback duration of the output video. The background image set may be a pre-set image set that is configured to store background images of different categories.

Since the generated audio data and the video output images that are generated according to the expression data are time-aligned, when the background images corresponding to the face image are determined, the audio data that is time-aligned with the face image may be determined first, and the audio duration corresponding to the audio data may be determined. After synthesis processing on the audio data and the video output images is performed, the output video may be generated. Therefore, the video duration of the output video may be calculated according to the audio duration, and the video duration of the output video is equal to the audio duration of the audio data. After the video duration is determined, the pre-stored background image set may be obtained, and the background images may be selected from the background image set according to the video duration.

In an exemplary embodiment of this disclosure, a quantity of an object action of the virtual object included in the output video under the video duration is determined; and the background images of a same quantity group is determined from the background image set according to the quantity of the object action and is used as the background images that match the face image.

The quantity of the object action may be a quantity of body movements performed by the virtual object in the live video that is determined according to the to-be-synthesized video data. A specific process of determining the background images according to the face image may include: determining the quantity of the object action of the virtual object included in the output video according to the video duration of the output video, for example, the output video including n actions of the virtual object; and selecting n groups of suitable background images from pre-stored common background images of the background image set to match the face image. Since each group of background images may correspond to a complete action, n groups of background images may correspond to n actions that are to be completed by the virtual object, and n groups of background images may just complete n actions at the end of a virtual video. That is, each group of background images corresponds to an action. The background images corresponding to each group of actions may be a same image to ensure a natural connection of the virtual video.

In step S320, the live video stream is synthesized in real time according to the to-be-synthesized video data and is pushed to the live streaming client.

In the exemplary implementation, the live video stream may be a video stream generated after video synthesis processing is performed on the to-be-synthesized video data and the live video stream may be pushed to the live streaming client in real time through the video streaming module. After generating the live video stream, a virtual video live server may push the live video stream to the live streaming client for a real-time playback. The live streaming client may be configured to receive the live video stream and present a virtual live video in real time on the live streaming client according to the live video stream. A live streaming interruption request may be an interruption request received by the virtual video live streaming server during a virtual live streaming process. The live streaming interruption request may be used for interrupting a current real-time virtual live video.

Referring to FIG. 4, the video streaming module 423 in the virtual video live streaming server 420, after receiving the to-be-synthesized video data, may perform video synthesis processing on the to-be-synthesized video data to synthesize the live video stream in real time, and push the live video stream to the live streaming client 410, so that the live streaming client 410 presents the virtual live video in real time according to the live video stream. The live streaming client 410 obtains the live video stream and presents the virtual live video corresponding to the live video stream in real time, which may be realized by the technical solutions below. The virtual video live streaming server 420 pushes the live video stream to a streaming interface of a corresponding streaming media playback address, so that the live streaming client 410 pulls the live video stream according to the streaming media playback address, and presents the virtual live video that is synthesized in real-time through a user interface of the live streaming client 410 in real-time.

When the virtual video live streaming server pushes the live video stream to the live streaming client, a user may send a live streaming interruption request to the virtual video live streaming server through the live streaming client. When receiving the live streaming interruption request, the virtual video live streaming server may handle the live streaming interruption request. The user may interact with the virtual object in the virtual video live streaming. When the virtual object is performing live streaming, the user may input voice or text through the live streaming client, such input voice or text may include live interaction with, or feedback to, the live streaming. When the live streaming client receives user interaction/feedback, the live streaming interruption request is generated. For example, the user asks the virtual object "how to use product A", and when the virtual object responses by introducing "an instruction for use of the product A" through real-time live streaming, the user answers "I see" through the live streaming client. In this case, the live streaming client generates the live streaming interruption request, and sends the live streaming interruption request to the virtual video live streaming server.

In step S330, in a case that the live streaming request is received, the target video data is determined from the to-be-synthesized video data that has not been generated into a live video stream in response to the live streaming interruption request.

In the exemplary implementation, the to-be-synthesized video data that has not been synthesized into a live video stream may be to-be-synthesized video data that has not undergone video synthesis processing after the virtual video live streaming server receives the live streaming interruption request. The to-be-synthesized video data that has not been synthesized into a live video stream may be video data that has undergone rendering processing of the 3D rendering module but has not undergone video synthesis processing of the video streaming module. The target video data may be video data that is determined from the to-be-synthesized data that has not been synthesized into a live video stream and the target video data may be used for generating corresponding video data of an interruption transition video stream after the live streaming interruption request, for example, the target video data may include target video images and target audio data.

After the virtual video live streaming server receives the live streaming interruption request, the 3D rendering module may determine the target video data from the to-be-synthesized video data that has not been synthesized into a live video stream, and generate a corresponding live video stream according to the target video data.

In an exemplary embodiment of this disclosure, remaining video output data is determined from the to-be-synthesized video data that has not been synthesized into a live video stream in response to the live streaming interruption request and the target video images are determined according to the remaining video output data; remaining audio data is determined from the to-be-synthesized video data that has not been synthesized into a live video stream in response to the live streaming interruption request and the target audio data is determined according to the remaining audio data and the target video images; and using the target video images and the target audio data as the target video data.

The remaining video output data may be video output data included in the to-be-synthesized video data that has not been synthesized into a live video stream and the remaining video output data may include the remaining video output images. The remaining audio data may be the audio data included in the to-be-synthesized video data that has not been synthesized into a live video stream. The remaining video output data and the remaining audio data are both the to-be-synthesized video data that has not undergone video synthesis processing.

After receiving the live streaming interruption request, the virtual video live streaming server may respectively determine the remaining video output data and the remaining audio data from the to-be-synthesized video that has not been synthesized into a live video stream, and determine the target video images according to the remaining video output data and determine the target audio data according to the remaining audio data and the target video images, and use the target video images and the target audio data as the target video data.

In an exemplary embodiment of this disclosure, remaining image frame duration corresponding to the remaining video output images is determined and whether the remaining image frame duration is greater than a duration threshold is determined. If the remaining image frame duration is greater than the duration threshold, a frame skipping step is determined, and the target video images are determined from the remaining video output images according to the frame skipping step.

The remaining video output image may be a video output image that has not been synthesized into a live video stream and a quantity of the remaining video output images may be recorded as F. The remaining image frame duration may be a time length corresponding to playing these remaining video output images, which may be recorded as T. The duration threshold may be a preset value that is used for being compared with the remaining image frame duration. The frame skipping step may be a step of a video frame that is used for selecting the target video images from the remaining video output images, which may be recorded as S. The target video images may be video images used for the virtual live video after the live streaming interruption request is generated.

Figure 5:
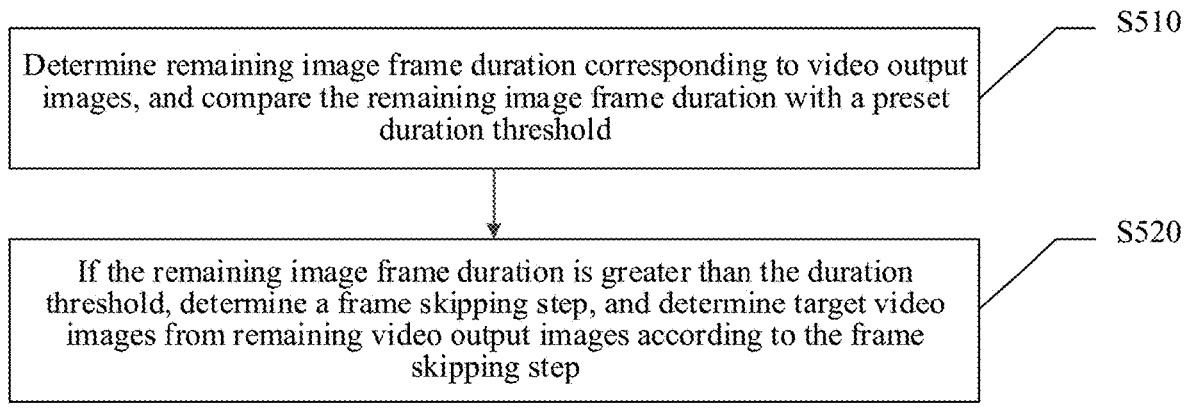
FIG. 5 schematically shows a flowchart of determining target video images from remaining video output images according to an embodiment of this disclosure.

After receiving the live streaming interruption request, the 3D rendering module in the virtual video live streaming server may perform frame skipping compression processing on the remaining video output images to determine the target video data. FIG. 5 schematically shows a flowchart of determining a target video image from remaining video input images according to an embodiment of this disclosure. FIG. 5 shows a procedure of performing frame skipping compression processing on remaining video output images. Specifically, the following steps may be included: in step S510, remaining image frame duration corresponding to video output images is determined, and the determined remaining image frame duration is compared with a preset duration threshold. In step S520, if the remaining image frame duration is greater than the duration threshold, a frame skipping step is determined to determine the target video images from the remaining video output images according to the frame skipping step. If the remaining image frame duration is less than the duration threshold, it means that a current video action may be returned to an initial position within a specified duration (the next video will start after the specified duration, so there is enough time for the current video to be finished, without reducing number of frames by stepping), and a smooth transition may be made between the current video and a next video, then the frame skipping compression processing is not performed, and the step of the frame skipping compression processing is ended.

In an exemplary embodiment of this disclosure, a possible implementation of determining the frame skipping step may be obtaining an image frame rate corresponding to the remaining video output images and determining a quantity of remaining images of the remaining video output images; determining the frame skipping step according to the quantity of remaining images and the image frame rate; and an implementation of determining the target video images from the remaining video output images according to the frame skipping step may be determining the target video images from the remaining video output images in chronological order and according to the frame skip step. The image frame rate may be a quantity of image frames that a live streaming client can play per second, and the image frame rate may be expressed in Fps. The quantity of remaining images may be a quantity of images corresponding to the remaining video output images.

For example, the duration threshold can be set to be 500 milliseconds to calculate the remaining image frame duration corresponding to the remaining video output images. The remaining image frame duration may be determined according to the image frame rate. For example, a calculation formula of the remaining image frame duration is: T=F/Fps*1000 (milliseconds). Therefore, if the remaining image frame duration obtained through calculation is less than 500 milliseconds, the frame skipping compression processing is not performed on the remaining video output images. If the remaining image frame duration obtained through calculation is greater than 500 milliseconds, a frame skipping compression processing step is performed on the remaining video output images. Specifically, the frame skipping compression processing step may include: determining the quantity of remaining images of the remaining video output images and obtaining the image frame rate corresponding to the remaining output video images, and determining the frame skipping step according to the image frame rate and the quantity of remaining images. A formula for calculating the frame skipping step may be: S=[F/(Fps/2)]. After the frame skipping step is obtained through calculation, a target video image may be determined from the remaining video output images at every frame skipping step in chronological order.

In an exemplary embodiment of this disclosure, a possible implementation of determining the target video image from the remaining video output images in chronological order and according to the frame skipping step may be obtaining a first frame image and a last frame image of the remaining video output images; determining an intermediate image from the remaining video output images at every frame skipping step, starting from the first frame image in chronological order; and using the first frame image, the intermediate image, and the last frame image as the target video images.

The first frame image may be a first frame of image determined from the remaining video output images in chronological order. The last frame image may be a last frame of image determined from the remaining video output images in chronological order. The intermediate image may be an image in the middle of the remaining video output images in chronological order.

After the frame skipping step is obtained through calculation, the target video images may be determined from the remaining video output images according to the frame skipping step. A specific process is as follows: first, the first frame of image (the first frame image, which is the beginning or start frame image) and the last frame of image (the last frame image) are obtained. Secondly, in chronological order, an image is extracted from the remaining output images as the intermediate image every S frame (the frame skipping step); in addition, an image may be randomly selected from the S frame as the intermediate image every S frame. The step is repeated until the remaining video output images have undergone the foregoing processing. Finally, the first frame image, one or more intermediate images and the last frame image that are obtained may be used as the target video images.

In an exemplary embodiment of this disclosure, if the remaining image frame duration is greater than the duration threshold, the frame skipping step is determined, and the method of determining the target video images from the remaining video output images according to the frame skipping step may alternatively be determining the quantity of target images of the target video images according to the frame skipping step; and determining an image similarity between every two adjacent images in the remaining video output images, and determining the target video images, a quantity of which does not exceed the quantity of target images from the remaining video output images according to the image similarity. The quantity of target images may be the quantity of target video images determined from the remaining video output images, and may be recorded as N. The image similarity may be a degree of similarity between the two adjacent images in the remaining video output images.

Figure 6:
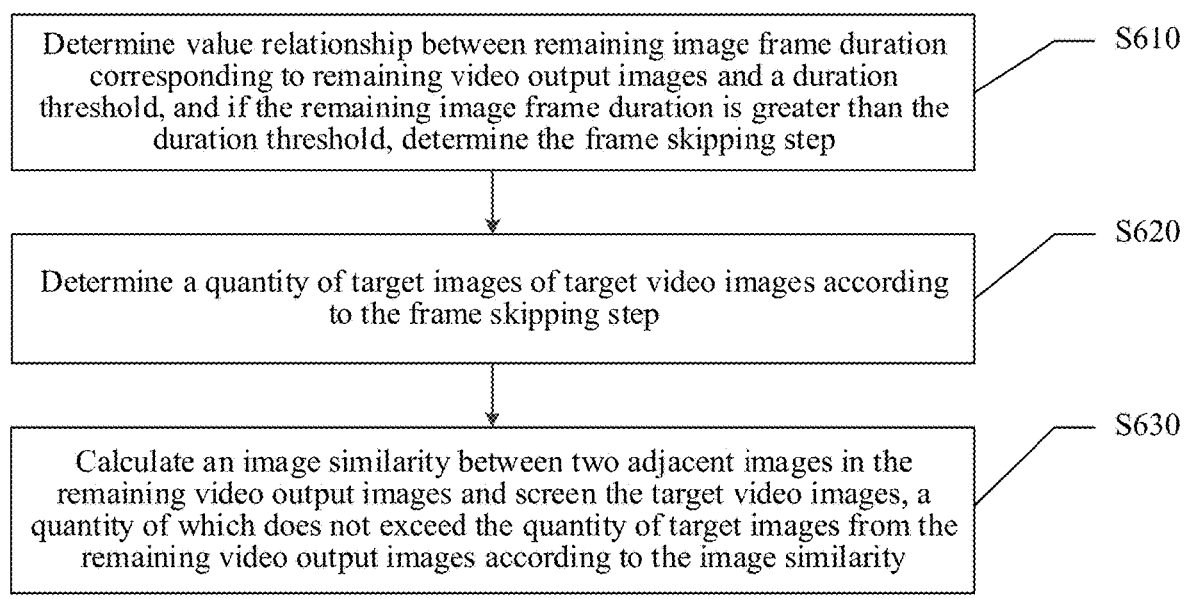
FIG. 6 schematically shows a flowchart of determining target video images from remaining video output images according to another embodiment of this disclosure.

FIG. 6 schematically shows a flowchart of determining target video images from remaining video output images according to another embodiment of this disclosure. FIG. 6 shows a process of determining the target video output images from the remaining video output images according to an image similarity between adjacent images. In step S610, value relationship between remaining image frame duration corresponding to the remaining video output images and a duration threshold may be compared. If the remaining image frame duration is greater than the duration threshold, a frame skipping step is determined. A calculation method of the frame skipping step is as same as the foregoing method, and details are not described herein again. In step S620, a quantity of target images corresponding to the target video images may be determined according to the frame skipping step. For example, a calculation formula of the quantity of target images N may be N=[F/S]. In step S630, the image similarity between every two adjacent images in the remaining video output images may be calculated, and the target video images, a quantity of which does not exceed the quantity of target images from the remaining video output images is screened according to the image similarity. For example, in the first M images of the remaining video output images, the image similarity between every two adjacent images is greater than a predefined threshold, (e.g., 95%), then one image from the first M images, for example, the start image of the first M images, the last image of the first M images, or the middle image of the first M images, may be selected as a target video image. This step is repeated until all the remaining video output images have finished the foregoing determining, so that the quantity of target video images obtained through determining does not exceed the quantity of target images.

In an exemplary embodiment of this disclosure, a possible implementation of determining target audio data according to remaining audio data and the target video images may be determining remaining audio duration of the remaining audio data, and determining whether the remaining audio duration is greater than the duration threshold; if the remaining audio duration is greater than the duration threshold, the remaining audio data is deleted; and determining target image frame duration corresponding to the target video images, and generating the target audio data according to the target image frame duration. The remaining audio duration may be a time length corresponding to the remaining audio data. The duration threshold may be a preset threshold that is used for being compared with the remaining audio duration. The target audio data may be the audio data used for generating an interruption transition video stream.

Figure 7:
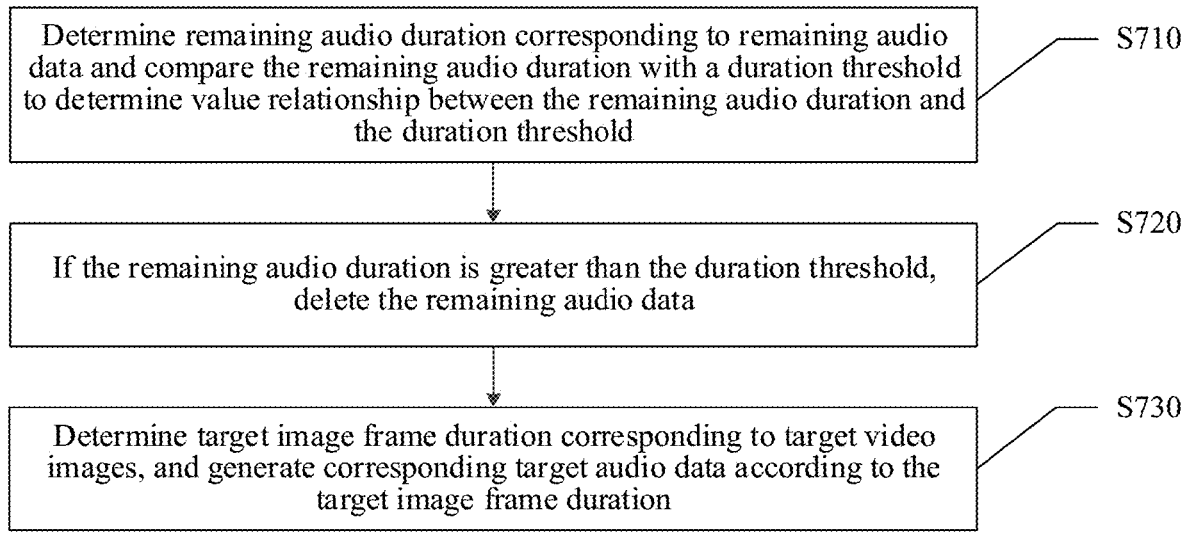
FIG. 7 schematically shows a flowchart of generating target audio data according to target image frame duration according to another embodiment of this disclosure.

FIG. 7 schematically shows a flowchart of generating target audio data according to target image frame duration according to an embodiment of this disclosure. In step S710, remaining audio duration corresponding to remaining audio data may be determined, and the remaining audio duration is compared with a duration threshold to determine value relationship between the remaining audio duration and the duration threshold. In step S720, if the remaining audio duration is greater than the duration threshold, the remaining audio data is deleted. In step S730, the target image frame duration corresponding to target video images is determined, and corresponding target audio data is generated according to the target image frame duration. For example, after the remaining audio data is deleted, a segment of mute audio A of equal duration may be generated according to the target image frame duration, and the mute audio A may be used as the target audio data. For another example, an audio clip, the duration of which is equal to the target image frame duration may be captured from the remaining audio data in chronological order, and the audio clip that has undergone volume adjustment processing is used as the target audio data. For another example, a target audio library can be pre-configured on the virtual video live streaming server, and an audio clip, the duration of which is equal to the target image frame duration may be selected from the target audio library as the target audio data.

In an exemplary embodiment of this disclosure, if target video data includes an interruption transition animation, a possible implementation of determining the target video data from to-be-synthesized video data that has not been synthesized into a live video stream in response to a live streaming interruption request may be: using the first video output image of the to-be-synthesized video data that has not been synthesized into a live video stream as a first interruption image in response to the live streaming interruption request; using the last video output image of the to-be-synthesized video data that has not been synthesized into a live video stream as a second interruption image in response to the live streaming interruption request; and generating the interruption transition animation of a preset duration according to the first interruption image and the second interruption image. The first interruption image may be the first frame of image determined from the to-be-synthesized video data (the remaining video output images) that has not been synthesized into a live video stream in chronological order. The second interruption image may be the last frame of image determined from the remaining video output images in chronological order. The interruption transition animation may be an animation generated according to the first interruption image and the second interruption image, and the interruption transition animation may reflect a transition state of converting the first interruption image to the second interruption image.

Figure 8:
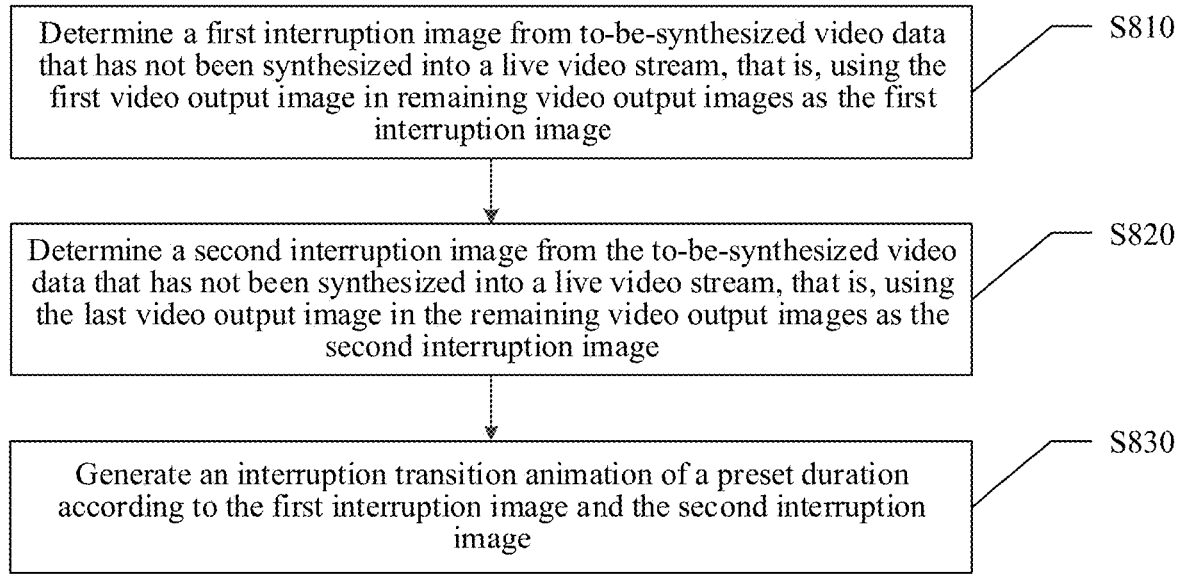
FIG. 8 schematically shows a flowchart of generating an interruption transition animation according to an embodiment of this disclosure.

FIG. 8 schematically shows a flowchart of generating an interruption transition animation according to an embodiment of this disclosure. In step S810, after receiving a live streaming interruption request, a virtual video live streaming server may determine a first interruption image from to-be-synthesized video data has not been synthesized into a live video stream, that is, using the first video output image in remaining video output images as the first interruption image. In step S820, the virtual video live streaming server may determine a second interruption image from the to-be-synthesized video data that has not been synthesized into a live video stream, that is, using the last video output image in the remaining video output images as the second interruption image. In step S830, the virtual video live streaming server may generate an interruption transition animation of a preset duration according to the first interruption image and the second interruption image, so as to use the generated interruption transition animation and target audio data as target video data. For example, a transition animation library may be configured on the virtual video live streaming server, and some transition animations corresponding to key expression feature images may be pre-stored in the transition animation library. After the first interruption image and the second interruption image are determined, the transition animation corresponding to the two images and playback duration of which is the preset duration is matched from the transition animation library as the interruption transition animation. In addition, after the first interruption image and the second interruption image are determined, the interruption transition animation of the preset duration may alternatively be generated in real time.

In step S304, an interruption transition video stream is synthesized according to the target video data, and the interruption transition video stream is pushed to a live streaming client.

In the exemplary implementation, the interruption transition video stream may be a video stream generated after video stream synthesis processing is performed on the target video data. After determining the target video data, the virtual video live streaming server may synthesize the interruption transition video stream according to the target video data, and push the interruption transition video stream to the live streaming client, so that the live streaming client can present a virtual live video obtained corresponding to the interruption transition video stream on a user interface in real time.

Figure 9:
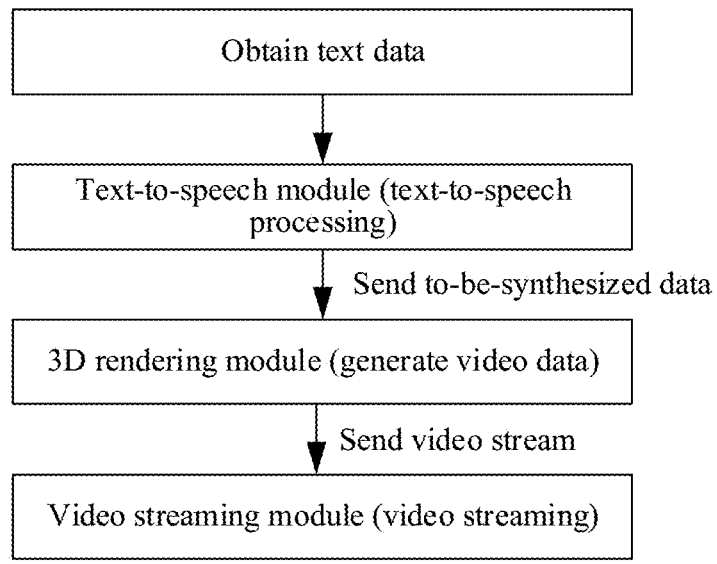
FIG. 9 schematically shows a framework diagram of an implementation of a virtual video streaming service according to an embodiment of this disclosure.

FIG. 9 schematically shows a framework diagram of an implementation of a virtual video streaming service according to an embodiment of this disclosure. In FIG. 9, the virtual video streaming service may include a text-to-speech module, a 3D rendering module, and a video streaming module.

When a live streaming client sends text data to a virtual video live streaming server, the text data sent by the live streaming client may be text that a virtual object is about to speak in a virtual live video; in addition, in some scenarios, the text data sent by the live streaming client may be part of the text that the virtual object is about to speak. Therefore, associated text data corresponding to the text data may be determined, and target text may be determined.

After the virtual video live streaming server determines the target text, the text-to-speech module may generate corresponding audio data and expression feature data according to the target text, package the audio data and the expression feature data into a data packet of to-be-synthesized video data, and push a to-be-synthesized data package to the 3D rendering module. For example, the text-to-speech module may obtain the audio data and expression feature data corresponding to the target text in a streaming manner. Each time the text-to-speech module obtains a data packet that includes audio data and expression feature data, the text-to-speech module pushes the data packet to the 3D rendering module; and after receiving a live streaming interruption request or a live streaming ending request, the virtual video live streaming server may forward a corresponding interruption signal or ending signal to the 3D rendering module.

When receiving a to-be-synthesized video data package, the 3D rendering module may extract the expression feature data to perform 3D rendering to obtain a group of corresponding face images, and perform image fusion processing on a face image and a background image to synthesize a complete image. A complete video output image is obtained, and then packaged with the audio data, and pushed to the video streaming module together. When receiving the interruption signal or the ending signal, the 3D rendering module may perform frame skipping compression processing on image data and the audio data that have not been sent to the video streaming module, and send target video data generated after the frame skipping compression processing to the video streaming module.

Each time the video streaming module obtains a data packet pushed by the 3D rendering module, the audio data and the image data may be extracted, and a live video stream or an interruption transition video stream is generated after synthesis processing is performed on the audio data and image frame data (or image data) through a fast forward moving picture expert group (FFMPEG) tool, and the live video stream or the interruption transition video stream is pushed to the live streaming client simultaneously. After receiving an interruption signal, the video streaming module may jump to a step of obtaining the text data; and after receiving the ending signal, the video streaming module may end the video streaming service, and disconnect a communication connection from the live streaming client.

In conclusion, the virtual video live streaming processing method of this application including: obtaining the text data and determining the to-be-synthesized video data corresponding to the text data; synthesizing the live streaming video stream is synthesized in real-time according to the to-be-synthesized data and pushing the live streaming video stream to the live streaming client; determining target video data from the to-be-synthesized video data that has not been synthesized into a live video stream in response to the live streaming interruption request during the live streaming interruption request is received; and synthesizing the interruption transition video stream according to the target video data, and pushing the interruption transition video stream to the live streaming client. On the one hand, the corresponding to-be-synthesized video data is generated through the text data. During a video live streaming process, the live video stream may be generated in real time even if there is no stable data source. On the other hand, problems such as video freezing caused by hard switching used for video interruption processing are avoided, thus effectively performing smooth transition processing when a live video is interruption, and improving smoothness of the virtual video live streaming. On the other hand, this application resolves the problem of smooth transition when the live video is interrupted and takes real-time performance of the live video into consideration, and controls a smooth transition process within a set duration, so that a current video action may be smoothly transitioned to a next text video action, and an impact on the real-time performance of a video may be reduced.

Although the steps of the method in this application are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 10:
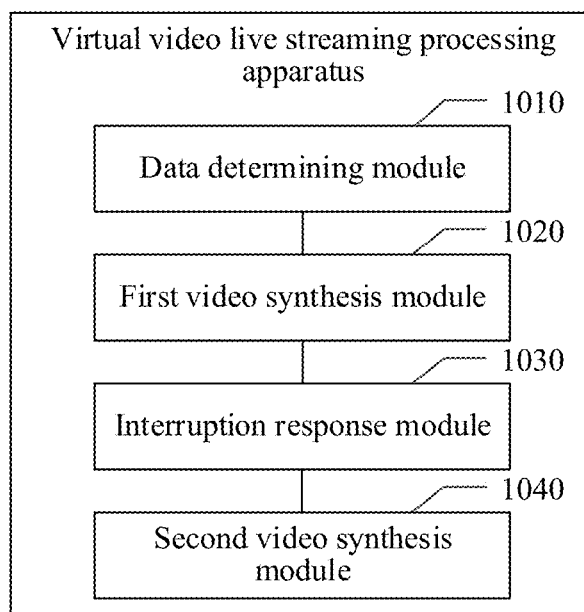
FIG. 10 schematically shows a structural diagram of a virtual video live streaming processing apparatus according to an embodiment of this disclosure.

Further, in an exemplary implementation, a virtual video live streaming processing apparatus is further provided. The virtual video live streaming processing apparatus may be applied to a server or a terminal device. As shown in FIG. 10, the virtual video live streaming processing apparatus 1000 may include a data determining module 1010, a first video synthesis module 1020, an interruption response module 1030, and a second video synthesis module 1040. The data determining module 1010 is configured to obtain text data and determine to-be-synthesized video data corresponding to the text data. In this disclosure, a unit and a module may be hardware such as a combination of electronic circuitries; firmware; or software such as computer instructions. The unit and the module may also be any combination of hardware, firmware, and software. In some implementation, a unit may include at least one module.

The first video synthesis module 1020 is configured to synthesize a live video stream in real time according to the to-be-synthesized video data and push the live video stream to a live streaming client.

The interruption response module 1030 is configured to determine, target video data from the to-be-synthesized video data that has not been synthesized into a live video stream in response to a live streaming interruption request during receiving the live streaming interruption request.

The second video synthesis module 1040 is configured to synthesize an interruption transition video stream according to the target video data and push the interruption transition video stream to the live streaming client.

In an exemplary embodiment of this disclosure, the data determining module includes: a target text determining unit, configured to determine associated text data related to the text data and use the text data and the associated text data as target text; an audio feature generation unit, configured to convert the target text into a corresponding target word vector, and encode and decode the target word vector to generate an audio feature of the target word vector; an audio data generation unit, configured to synthesize the audio feature to generate audio data; and an image generation unit, configured to determine expression feature data corresponding to the target text, and generate the video output images according to the expression feature data.

In an exemplary embodiment of this disclosure, an image generation unit includes: a face image generation unit, configured to perform rendering processing on the expression feature data to generate a face image corresponding to a virtual object; a background image determining unit, configured to determine background images that match the face image, the background images including body movement information and environment background information of the virtual object; and an image fusion unit, configured to perform image fusion processing on the face image and the background images to generate the video output images.

In an exemplary embodiment of this disclosure, the background image determining unit includes: an audio duration determining subunit, configured to determine audio duration of the audio data that is time-aligned with the face image; a video duration determining subunit, configured to determine video duration of an output video according to the audio duration; and a background image determining subunit, configured to determine the background images that match the face image from a pre-stored background image set according to the video duration.

In an exemplary embodiment of this disclosure, the background image determining subunit is configured to determine a quantity of an object action of the virtual object in the output video under the video duration; and determine the background images of a same quantity group from the background image set as the background images that match the face image according to the quantity of the object action.

In an exemplary embodiment of this disclosure, an interruption response module includes: a target image determining unit, configured to determine remaining video output data from the to-be-synthesized video data that has not been synthesized into a live video stream in response to the live streaming interruption request and determine target video images according to the remaining video output data; a target audio determining unit, configured to determine remaining audio data from the to-be-synthesized video data that has not been synthesized into a live video stream in response to the live streaming interruption request and determine target audio data according to the remaining audio data and the target video images; and a video data determining unit, configured to use the target video images and the target audio data as the target video data.

In an exemplary embodiment of this disclosure, a target image determining unit includes: a duration determining subunit, configured to determine remaining image frame duration corresponding to the remaining video output images; and a target image determining subunit, configured to determine, in a case that the remaining image frame duration is greater than a duration threshold, a frame skipping step; and determine the target video images from the remaining video output images according to the frame skipping step.

In an exemplary embodiment of this disclosure, a target image determining subunit includes: a frame skipping step determining subunit, configured to obtain an image frame rate corresponding to the remaining video output images and determine a quantity of remaining images of the remaining video output images, and determine the frame skipping step according to the quantity of remaining images and the image frame rate; and an image determining subunit, configured to determine the target video images from the remaining video output images in chronological order and according to the frame skipping step.

In an exemplary embodiment of this disclosure, an image determining subunit is configured to obtain a first frame image and a last frame image of the remaining video output images; determine an intermediate image from the remaining video output images at every frame skipping step in chronological order, starting from the first frame image; and use the first frame image, the intermediate image, and the last frame image as the target video images.

In an exemplary embodiment of this disclosure, a target image determining unit may further be configured to determine a quantity of target images of the target video images according to the frame skipping step; determine an image similarity between two adjacent images in the remaining video output images; and determine the target video images, a quantity of which does not exceed the quantity of target images from the remaining video output images according to the image similarity.

In an exemplary embodiment of this disclosure, a target audio determining unit is configured to determine remaining audio duration of the remaining audio data; delete, in a case that the remaining audio duration is greater than a duration threshold, the remaining audio data; determine target image frame duration corresponding to the target video images; and generate the target audio data according to the target image frame duration.

In an exemplary embodiment of this disclosure, an interruption response module further includes an animation generation subunit, the animation subunit being configured to use the first video output image of the to-be-synthesized video data that has not been synthesized into a live video stream as a first interruption image in response to the live streaming interruption request; use the last video output image of the to-be-synthesized video data that has not been synthesized into a live video stream as a second interruption image in response to the live streaming interruption request; and generate an interruption transition animation of a preset duration according to the first interruption image and the second interruption image.

Details of the modules or units in the virtual video live streaming processing apparatus have been specifically described in the corresponding virtual video live streaming processing method. Therefore, details are not described herein again.

Although several modules or units of a device for action execution are mentioned in the foregoing detailed descriptions, the division is not mandatory. Actually, according to the implementations of this application, the features and functions of two or more modules or units described above may be specified in one module or unit. Conversely, the features and functions of one module or unit described above may be further divided into a plurality of modules or units to be embodied.

Other embodiments of this disclosure will be apparent to a person skilled in the art from consideration of the specification and practice of the disclosure here. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the scope and spirit of the present application are pointed out in the following claims.

It is to be understood that the present application is not limited to the precise structures described above and shown in the accompanying drawings, and various modifications and changes can be made without departing from the scope of the present application. The scope of this application is subject only to the appended claims.

What is claimed is:

1. A method for virtual live streaming, performed by an electronic device, the method comprising:
 obtaining text data and determining to-be-synthesized video data corresponding to the text data;
 synthesizing a live video stream in real time according to the to-be-synthesized video data and pushing the live video stream to a live streaming client;
 determining target video data in the to-be-synthesized video data that has not been synthesized into the live video stream in response to a live streaming interruption request; and
 synthesizing an interruption transition video stream according to the target video data, and pushing the interruption transition video stream to the live streaming client.

2. The method according to claim 1, wherein the to-be-synthesized video data comprises audio data and video output images, and determining the to-be-synthesized video data corresponding to the text data comprises:
 determining associated text data related to the text data and using the text data and the associated text data as target text;
 converting the target text into a corresponding target word vector, and encoding and decoding the target word vector to generate an audio feature of the target word vector;
 synthesizing the audio feature to generate the audio data; and
 determining expression feature data corresponding to the target text, and generating the video output images according to the expression feature data.

3. The method according to claim 2, wherein generating the video output images according to the expression feature data comprises:
 rendering the expression feature data to generate a face image corresponding to a virtual object;
 determining background images that match the face image, the background images comprising body movement information and environment background information of the virtual object; and
 fusing the face image and the background images to generate the video output images.

4. The method according to claim 3, wherein determining the background images that match the face image comprises:
 determining audio duration of the audio data that is time aligned with the face image;
 determining video duration of an output video according to the audio duration; and
 determining the background images that match the face image from a pre-stored background image set according to the video duration.

5. The method according to claim 4, wherein determining the background images that match the face image from a pre-stored background image set according to the video duration comprises:
 determining a number of actions by the virtual object in the output video in the video duration to be n, n being a positive integer; and
 determining n subsets of background images from the background image set as the background images that match the face image.

6. The method according to claim 1, wherein determining the target video data comprises:
 determining remaining video output data from the to-be-synthesized video data that has not been synthesized into the live video stream in response to the live streaming interruption request;
 determining target video images according to the remaining video output data;
 determining remaining audio data from the to-be-synthesized video data that has not been synthesized into the live video stream in response to the live streaming interruption request;

determining target audio data according to the remaining audio data and the target video images; and using the target video images and the target audio data as the target video data.

7. The method according to claim 6, wherein the remaining video output data comprises remaining video output images, and determining the target video images according to the remaining video output data comprises:

determining a frame duration corresponding to the remaining video output images;

determining, in response to the remaining image frame duration being greater than a duration threshold, a frame skipping step; and determining the target video images from the remaining video output images according to the frame skipping step.

8. The method according to claim 7, wherein:

determining the frame skipping step comprises:

obtaining an frame rate corresponding to the remaining video output images and determining a quantity of the remaining video output images;

determining the frame skipping step according to the quantity of remaining video output images and the frame rate; and determining the target video images from the remaining video output images according to the frame skipping step comprises:

determining the target video images from the remaining video output images in chronological order and according to the frame skipping step.

9. The method according to claim 8, wherein determining the target video images from the remaining video output comprises:

obtaining a start frame image and a last frame image of the remaining video output images;

determining intermediate images from the remaining video output images based on the frame skipping step in the chronological order, starting from the start frame image; and using the start frame image, the intermediate images, and the last frame image as the target video images.

10. The method according to claim 7, wherein determining the target video images from the remaining video output images according to the frame skipping step comprises:

determining a number of required images from the target video images according to the frame skipping step;

determining an image similarity between two adjacent images in the remaining video output images; and determining the target video images according to the image similarity, wherein a number of the target video images does not exceed the number of required images.

11. The method according to claim 6, wherein determining the target audio data according to the remaining audio data and the target video images comprises:

determining remaining audio duration of the remaining audio data;

in response to the remaining audio duration being greater than a duration threshold, cropping the remaining audio data to obtain cropped remaining audit data which is within the duration threshold;

determining target image frame duration corresponding to the target video images; and generating the target audio data according to the target image frame duration.

12. The method according to claim 1, wherein the target video data comprises an interruption transition animation, and wherein determining the target video data in the to-be-synthesized video data that has not been synthesized into the live video stream in response to the live streaming interruption request comprises:

using a start video output image of the to-be-synthesized video data that has not been synthesized into a live video stream as a first interruption image in response to the live streaming interruption request;

using the last video output image of the to-be-synthesized video data that has not been synthesized into a live video stream as a second interruption image in response to the live streaming interruption request; and generating the interruption transition animation of a preset duration according to the first interruption image and the second interruption image.

13. A device for virtual live streaming, the device comprising a memory for storing computer instructions and a processor in communication with the memory, wherein, when the processor executes the computer instructions, the processor is configured to cause the device to:

obtain text data and determine to-be-synthesized video data corresponding to the text data;

synthesize a live video stream in real time according to the to-be-synthesized video data and push the live video stream to a live streaming client;

determining target video data in the to-be-synthesized video data that has not been synthesized into the live video stream in response to a live streaming interruption request; and synthesize an interruption transition video stream according to the target video data, and push the interruption transition video stream to the live streaming client.

14. The device according to claim 13, wherein the to-be synthesized video data comprises audio data and video output images, and wherein, when the processor is configured to cause the device to determine the to-be-synthesized video data corresponding to the text data, the processor is configured to cause the device to:

determine associated text data related to the text data and using the text data and the associated text data as target text;

convert the target text into a corresponding target word vector, and encoding and decode the target word vector to generate an audio feature of the target word vector;

synthesize the audio feature to generate the audio data; and determine expression feature data corresponding to the target text, and generate the video output images according to the expression feature data.

15. The device according to claim 14, wherein, when the processor is configured to cause the device to generate the video output images according to the expression feature data, the processor is configured to cause the device to:

render the expression feature data to generate a face image corresponding to a virtual object;

determine background images that match the face image, the background images comprising body movement information and environment background information of the virtual object; and fuse the face image and the background images to generate the video output images.

16. The device according to claim 15, wherein, when the processor is configured to cause the device to determine the background images that match the face image, the processor is configured to cause the device to:

determine audio duration of the audio data that is time aligned with the face image;

determine video duration of an output video according to the audio duration; and determine the background images that match the face image from a pre-stored background image set according to the video duration.

17. A non-transitory storage medium for storing computer readable instructions, the computer readable instructions, when executed by a processor, causing the processor to:

obtain text data and determine to-be-synthesized video data corresponding to the text data;

synthesize a live video stream in real time according to the to-be-synthesized video data and push the live video stream to a live streaming client;

determining target video data in the to-be-synthesized video data that has not been synthesized into the live video stream in response to a live streaming interruption request; and synthesize an interruption transition video stream according to the target video data, and push the interruption transition video stream to the live streaming client.

18. The non-transitory storage medium according to claim 17, wherein the to-be synthesized video data comprises audio data and video output images, and wherein, when the computer readable instructions cause the processor to determine the to-be-synthesized video data corresponding to the text data, the computer readable instructions cause the processor to:

determine associated text data related to the text data and using the text data and the associated text data as target text;

convert the target text into a corresponding target word vector, and encoding and decode the target word vector to generate an audio feature of the target word vector;

synthesize the audio feature to generate the audio data; and determine expression feature data corresponding to the target text, and generate the video output images according to the expression feature data.

19. The non-transitory storage medium according to claim 18, wherein, when the computer readable instructions cause the processor to generate the video output images according to the expression feature data, the computer readable instructions cause the processor to:

render the expression feature data to generate a face image corresponding to a virtual object;

determine background images that match the face image, the background images comprising body movement information and environment background information of the virtual object; and fuse the face image and the background images to generate the video output images.

20. The non-transitory storage medium according to claim 19, wherein, when the computer readable instructions cause the processor to determine the background images that match the face image, the computer readable instructions cause the processor to:

determine audio duration of the audio data that is time aligned with the face image;

determine video duration of an output video according to the audio duration; and determine the background images that match the face image from a pre-stored background image set according to the video duration.

\* \* \* \* \*